(12) United States Patent
Schroder et al.

(10) Patent No.: US 10,619,421 B2
(45) Date of Patent: Apr. 14, 2020

(54) METHODS OF FORMING STATIONARY ELEMENTS OF ROTATABLE CUTTING ELEMENTS FOR USE ON EARTH-BORING TOOLS AND STATIONARY ELEMENTS FORMED USING SUCH METHODS

(71) Applicant: Baker Hughes, a GE company, LLC, Houston, TX (US)

(72) Inventors: Jon David Schroder, The Woodlands, TX (US); Kegan L. Lovelace, Houston, TX (US); John Abhishek Raj Bomidi, Spring, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 51 days.

(21) Appl. No.: 15/810,412

(22) Filed: Nov. 13, 2017

(65) Prior Publication Data

US 2019/0145179 A1    May 16, 2019

(51) Int. Cl.
*E21B 10/42* (2006.01)
*B23P 11/00* (2006.01)
(Continued)

(52) U.S. Cl.
CPC .............. *E21B 10/42* (2013.01); *B23P 11/00* (2013.01); *E21B 4/06* (2013.01); *E21B 10/36* (2013.01); *E21C 35/18* (2013.01); *E21B 34/14* (2013.01)

(58) Field of Classification Search
CPC .......... E21C 35/18; E21B 10/42; E21B 10/54; E21B 10/62; E21B 10/52
See application file for complete search history.

(56) References Cited

U.S. PATENT DOCUMENTS

| 3,945,681 A | * | 3/1976 | White ................. E21C 35/19 299/107 |
| 4,542,942 A | | 9/1985 | Zitz et al. |

(Continued)

FOREIGN PATENT DOCUMENTS

| EP | 2143872 A1 | 1/2010 |
| GB | 2541812 A | 3/2017 |

(Continued)

OTHER PUBLICATIONS

Moss et al., U.S. Appl. No. 15/662,626, filed Jul. 28, 2017 and titled Rotatable Cutters and Elements for Use on Earth Boring Tools in Subterranean Boreholes and Related Methods.
(Continued)

*Primary Examiner* — Nicole Coy
*Assistant Examiner* — Dany E Akakpo
(74) *Attorney, Agent, or Firm* — TraskBritt

(57) ABSTRACT

Methods of forming a stationary housing of a rotatable cutting element for use on an earth-boring tool may include forming one or more annular recesses extending around an outer surface of a first sleeve, inserting the first sleeve within a second sleeve, joining the first sleeve with the second sleeve, and removing a portion of material from an inner surface of the first sleeve to expose the annular recesses. Methods may also include forming a first portion and a second portion of a sleeve, forming an annular recess around an entire perimeter of an inner surface of each of the first portion and the second portion of the sleeve proximate a longitudinal end thereof, and bonding the longitudinal ends of the first portion and the second portion of the sleeve along an interface therebetween. Stationary housings formed from such methods are also provided.

20 Claims, 6 Drawing Sheets

(51) Int. Cl.
  *E21B 34/14* (2006.01)
  *E21B 4/06* (2006.01)
  *E21B 10/36* (2006.01)
  *E21C 35/18* (2006.01)

(56) References Cited

U.S. PATENT DOCUMENTS

| | | |
|---|---|---|
| 4,553,615 A | 11/1985 | Grainger |
| 4,654,947 A | 4/1987 | Davis |
| 4,751,972 A | 6/1988 | Jones et al. |
| 7,604,073 B2 | 10/2009 | Cooley et al. |
| 7,703,559 B2 | 4/2010 | Shen et al. |
| 7,762,359 B1 | 7/2010 | Miess |
| 7,845,436 B2 | 12/2010 | Cooley et al. |
| 7,987,931 B2 | 8/2011 | Cooley et al. |
| 8,061,452 B2 | 11/2011 | Cooley et al. |
| 8,079,431 B1 | 12/2011 | Cooley et al. |
| 8,091,655 B2 | 1/2012 | Shen et al. |
| 8,210,285 B2 | 7/2012 | Cooley et al. |
| 8,413,746 B2 | 4/2013 | Shen et al. |
| 8,561,728 B2 | 10/2013 | Cooley et al. |
| 8,590,627 B2 | 11/2013 | Jin et al. |
| 8,800,691 B2 | 8/2014 | Shen et al. |
| 8,881,849 B2 | 11/2014 | Shen et al. |
| 8,931,582 B2 | 1/2015 | Cooley et al. |
| 8,950,516 B2 | 2/2015 | Newman |
| 8,973,684 B1 | 3/2015 | Cooley et al. |
| 8,991,523 B2 | 3/2015 | Shen et al. |
| 9,016,409 B2 | 4/2015 | Zhang et al. |
| 9,033,070 B2 | 5/2015 | Shen et al. |
| 9,091,132 B1 | 7/2015 | Cooley et al. |
| 9,187,962 B2 | 11/2015 | Burhan et al. |
| 9,279,294 B1 | 3/2016 | Cooley et al. |
| 9,284,790 B2 | 3/2016 | Zhang et al. |
| 9,291,000 B2 | 3/2016 | Zhang et al. |
| 9,322,219 B2 | 4/2016 | Burhan et al. |
| 9,328,564 B2 | 5/2016 | Zhang et al. |
| 9,382,762 B2 | 7/2016 | Cooley et al. |
| 9,388,639 B2 | 7/2016 | Patel et al. |
| 9,464,486 B2 | 10/2016 | Zhang et al. |
| 9,605,486 B2 | 3/2017 | Burhan et al. |
| 9,624,731 B2 | 4/2017 | Haugvaldstad et al. |
| 9,803,427 B1 | 10/2017 | Colley et al. |
| 9,920,579 B2 | 3/2018 | Newman |
| 10,267,096 B2 | 4/2019 | Burhan et al. |
| 2007/0137899 A1* | 6/2007 | Beccu ................ E21B 10/62 |
| | | 175/296 |
| 2008/0035386 A1 | 2/2008 | Hall et al. |
| 2008/0251293 A1 | 10/2008 | Mumma et al. |
| 2010/0314176 A1 | 12/2010 | Zhang et al. |
| 2011/0017514 A1 | 1/2011 | Anderle |
| 2012/0234609 A1 | 9/2012 | Cooley et al. |
| 2012/0273281 A1 | 11/2012 | Burhan et al. |
| 2012/0318580 A1 | 12/2012 | Oesterberg |
| 2013/0098688 A1 | 4/2013 | Yong et al. |
| 2014/0054094 A1 | 2/2014 | Burhan et al. |
| 2014/0131118 A1 | 5/2014 | Chen et al. |
| 2014/0246246 A1 | 9/2014 | Radford |
| 2014/0271008 A1 | 9/2014 | Sweetman et al. |
| 2014/0326515 A1 | 11/2014 | Shi et al. |
| 2014/0326516 A1 | 11/2014 | Haugvaldstad et al. |
| 2014/0345951 A1* | 11/2014 | Shen ................ E21B 10/5673 |
| | | 175/374 |
| 2014/0360789 A1 | 12/2014 | Siracki et al. |
| 2014/0360792 A1 | 12/2014 | Azar et al. |
| 2015/0047910 A1 | 2/2015 | Chen et al. |
| 2015/0129310 A1 | 5/2015 | Newman |
| 2015/0266088 A1 | 9/2015 | Shimizu et al. |
| 2016/0290056 A1 | 10/2016 | Propes et al. |
| 2017/0036269 A1 | 2/2017 | Lim et al. |
| 2017/0100756 A1 | 4/2017 | Hewitt |
| 2017/0191317 A1 | 7/2017 | Burhan et al. |
| 2019/0078393 A1 | 3/2019 | Moss et al. |

FOREIGN PATENT DOCUMENTS

| | | |
|---|---|---|
| WO | 2012/149120 A2 | 11/2012 |
| WO | 2014/078683 A1 | 5/2014 |
| WO | 2015/023953 A1 | 2/2015 |
| WO | 2016/018204 A1 | 2/2016 |

OTHER PUBLICATIONS

Moss et al., U.S. Appl. No. 15/704,955, filed Sep. 14, 2017 and titled Earth-Boring Tools Including Rotatable Cutting Element Assemblies and Related Methods of Forming and Using the Same.
Schroder et al., U.S. Appl. No. 15/662,647, filed Jul. 28, 2017 and titled Moveable Cutters and Devices Including One or More Seals for Use on Earth-Boring Tools in Subterranean Boreholes and Related Methods.

* cited by examiner

METHODS OF FORMING STATIONARY ELEMENTS OF ROTATABLE CUTTING ELEMENTS FOR USE ON EARTH-BORING TOOLS AND STATIONARY ELEMENTS FORMED USING SUCH METHODS

FIELD

Embodiments of the present disclosure relate generally to devices and methods involving rotatable cutting elements for earth-boring tools used in earth-boring operations and, more specifically, to methods of forming annular recesses on inner surfaces of stationary elements (e.g., housings) configured to retain rotatable cutting elements and to stationary elements formed using such methods.

BACKGROUND

Various earth-boring tools such as rotary drill bits (including roller cone bits and fixed-cutter or drag bits), core bits, eccentric bits, bicenter bits, reamers, and mills are commonly used in forming bore holes or wells in earth formations. Such tools often may include one or more cutting elements on a formation-engaging surface thereof for removing formation material as the earth-boring tool is rotated or otherwise moved within the borehole.

For example, fixed-cutter bits (often referred to as "drag" bits) have a plurality of cutting elements affixed or otherwise secured to a face (i.e., a formation-engaging surface) of a bit body. Cutting elements generally include a cutting surface, where the cutting surface is usually formed out of a superabrasive material, such as mutually bound particles of polycrystalline diamond. The cutting surface is generally formed on and bonded to a supporting substrate of a hard material such as cemented tungsten carbide. During a drilling operation, a portion of a cutting edge, which is at least partially defined by the peripheral portion of the cutting surface, is pressed into the formation. As the earth-boring tool moves relative to the formation, the cutting element is dragged across the surface of the formation and the cutting edge of the cutting surface shears away formation material. Such cutting elements are often referred to as "polycrystalline diamond compact" (PDC) cutting elements, or cutters.

During drilling, cutting elements are subjected to high temperatures due to friction between the cutting surface and the formation being cut, high axial loads from the weight on bit (WOB), and high impact forces attributable to variations in WOB, formation irregularities and material differences, and vibration. These conditions can result in damage to the cutting surface (e.g., chipping, spalling). Such damage often occurs at or near the cutting edge of the cutting surface and is caused, at least in part, by the high impact forces that occur during drilling. Damage to the cutting element results in decreased cutting efficiency of the cutting element. When the efficiency of the cutting element decreases to a critical level the operation must be stopped to remove and replace the drill bit or damaged cutters, which is a large expense for an operation utilizing earth-boring tools.

Securing a PDC cutting element to a drill bit restricts the useful life of such cutting element, as the cutting edge of the diamond table wears down as does the substrate, creating a so-called "wear flat" and necessitating increased weight on bit to maintain a given rate of penetration of the drill bit into the formation due to the increased surface area presented. In addition, unless the cutting element is heated to remove it from the bit and then rebrazed with an unworn portion of the cutting edge presented for engaging a formation, more than half of the cutting element is never used.

Attempts have been made to configure cutting elements to rotate such that the entire cutting edge extending around each cutting element may selectively engage with and remove material. By utilizing the entire cutting edge, the effective life of the cutting element may be increased. Some designs utilize mechanisms (e.g., bearings, sleeves, etc.) to allow the cutting element to turn by displacing the cutting element linearly with respect to the longitudinal axis of the cutting element to engage or disengage an index positioning feature, or to float and allow free rotation. Features, such as the index positioning feature, may be configured to retain rotatable elements and to enable and/or control rotation of the cutting elements.

BRIEF SUMMARY

In one embodiment of the disclosure, a method of forming a stationary housing of a rotatable cutting element for use on an earth-boring tool may include forming one or more annular recesses extending around an outer surface of a first generally cylindrical sleeve. The method may include inserting the first generally cylindrical sleeve within a second generally cylindrical sleeve and joining the first generally cylindrical sleeve with the second generally cylindrical sleeve. The method may also include removing a portion of material from an inner surface of the first generally cylindrical sleeve to expose the annular recesses.

In another embodiment of the disclosure, a method of forming a stationary housing of a rotatable cutting element for use on an earth-boring tool may include forming a first portion and a second portion of a generally cylindrical sleeve and forming an annular recess around an entire perimeter of an inner surface of each of the first portion and the second portion of the generally cylindrical sleeve proximate a longitudinal end thereof. The method may also include positioning the longitudinal ends of the first portion and the second portion of the generally cylindrical sleeve and bonding the longitudinal ends of the first portion and the second portion of the generally cylindrical sleeve to form a track comprising the annular recesses on an inner surface of the generally cylindrical sleeve.

In a further embodiment of the disclosure, a stationary housing of a rotatable cutting element for use on an earth-boring tool may include a first generally cylindrical sleeve and a second generally cylindrical sleeve secured to the first generally cylindrical sleeve along an interface therebetween. At least one of the first generally cylindrical sleeve and the second generally cylindrical sleeve may include surfaces defining one or more annular recesses around an inner surface of the at least one of the first generally cylindrical sleeve and the second generally cylindrical sleeve for receiving one or more pins extending from a rotatable element disposed at least partially within an interior region of the stationary housing.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

FIGS. 3 through 5 illustrate stages in a method of forming the stationary element of FIG. 2A, according to an embodiment of the present disclosure, wherein:

FIG. 3 is a perspective view of a stage in the method;

FIG. 4 is a cross-sectional perspective view of another stage following that of FIG. 3; and FIG. 5 is a cross-sectional perspective view of another stage following that of FIG. 4.

FIGS. 6A through 8 illustrate stages in a method of forming the stationary element of FIG. 2A, according to another embodiment of the present disclosure, wherein:

FIG. 6A is a bottom perspective view of an upper portion of a stationary element at a stage in the method;

FIG. 7 is a perspective view of another stage following that of FIGS. 6A and 6B; and FIG. 8 is a cross-sectional perspective view of the stationary element shown in FIG. 7.

DETAILED DESCRIPTION

Figure 1:
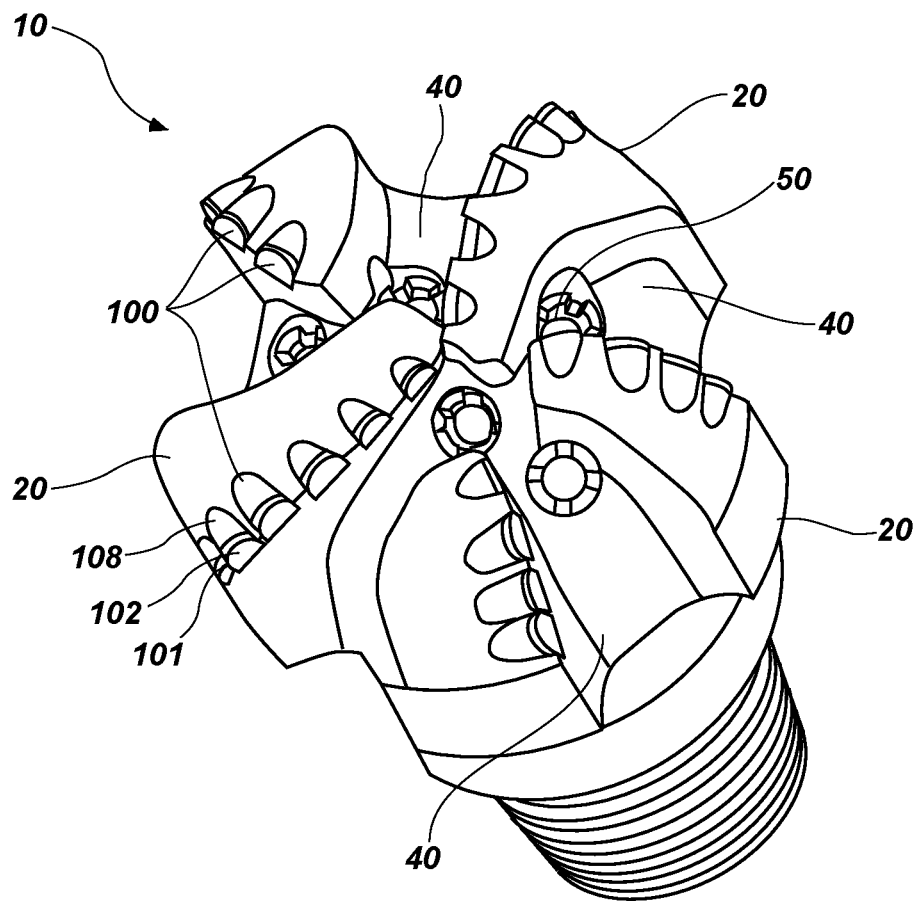
FIG. 1 illustrates a fixed-cutter earth-boring tool commonly known as a "drag-bit," in accordance with embodiments of the present disclosure.

The illustrations presented herein are not actual views of any particular tool or drill string, but are merely idealized representations that are employed to describe example embodiments of the present disclosure. The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. Also note, any drawings accompanying the application are for illustrative purposes only, and are thus not drawn to scale. Additionally, elements common between figures may retain the same numerical designation.

Disclosed embodiments relate generally to stationary elements (e.g., housings) configured to retain rotatable elements (e.g., cutting elements) that may rotate in order to alter the rotational positioning of the cutting element relative to a subterranean formation engaged by an earth-boring tool to which the cutting element is coupled. Some embodiments of such stationary elements for rotatable cutting elements may include an index positioning feature including a track configured to retain the rotatable elements and to enable and/or control rotation of the cutting element. In some embodiments, the track may be defined in an inner surface of the stationary element. By segmenting the stationary element into multiple (e.g., two) sections to manufacture such element, portions of the whole may be manufactured by traditional means (e.g., forging, molding, machining, etc.) to facilitate ease of manufacturing.

Such stationary elements may be implemented in a variety of earth-boring tools, such as, for example, rotary drill bits, percussion bits, core bits, eccentric bits, bicenter bits, reamers, expandable reamers, mills, drag bits, hybrid bits, and other drilling bits and tools known in the art.

As used herein, the term "wear-resistant material" means and includes a material exhibiting enhanced resistance to at least one of abrasive wear and erosive wear and includes any material exhibiting a Vickers hardness of 1700 HV or greater.

The terms "sintered" or "sintering," as used herein, mean temperature driven mass transport resulting in densification as particles undergo grain-growth and grain-shape changes, and typically involves removal of at least a portion of the pores between the starting particles (accompanied by shrinkage) combined with coalescence and bonding among adjacent particles.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

Referring to FIG. 1, a perspective view of an earth-boring tool 10 in the form of a fixed-cutter, or so-called "drag bit," is shown. The earth-boring tool 10 may have blades 20 in which a plurality of cutting elements 100 may be secured. The cutting elements 100 may have a substrate 108 and a cutting table 101 with a cutting surface 102, which may form the cutting edge of the blade 20. The earth-boring tool 10 may rotate about a longitudinal axis of the earth-boring tool 10. When the earth-boring tool 10 rotates, the cutting surface 102 of the cutting elements 100 may contact the earth formation and remove material. The material removed by the cutting surfaces 102 may then be removed through the junk slots 40. The earth-boring tool 10 may include nozzles 50 which may introduce drilling fluid, commonly known as drilling mud, into the area around the blades 20 to aid in removing the sheared material and other debris from the area around the blades 20 to increase the efficiency of the earth-boring tool 10.

In applications where the cutting elements 100 are rotationally fixed, only the edge of the cutting surface 102 of the cutting elements 100 that is exposed above the surface of the blade 20 will contact the earth formation and wear down during use. By enabling rotation of the cutting element 100, relatively more of (e.g., a majority of, a substantial entirety of) the edge of the cutting surface 102 may be exposed to wear in order to extend the life of the cutting element 100. Additional control over the frequency of the rotation, as well as the amount of rotation, may further extend the life of the cutting element 100.

Figure 2A:
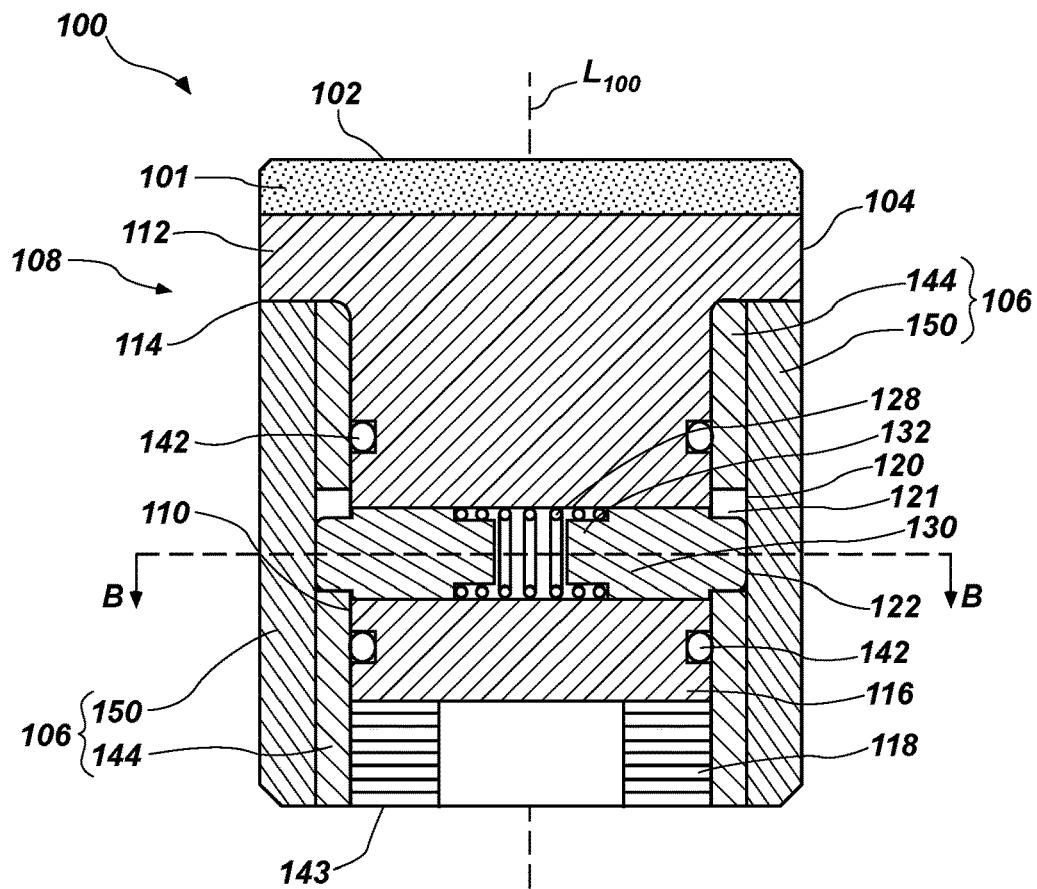
FIG. 2A is a cross-sectional side view of a rotatable cutting element and a stationary element in accordance with an embodiment of the present disclosure.

FIG. 2A shows a rotatable embodiment of a cutting element 100 shown in FIG. 1. The rotatable cutting element 100 may comprise the cutting table 101 with the cutting surface 102 and the substrate 108. The substrate 108 of the rotatable cutting element 100 may comprise a rotatable element 104, a stationary element 106 (e.g., stationary housing) and an index positioning feature 120. The rotatable element 104 may include the cutting table 101 with the cutting surface 102, which is configured to engage a portion of a subterranean borehole, over a support structure 112. The cutting table 101 may have a diameter at least as large as the stationary element 106. A lower portion (as the drawing figure is oriented on the page) of the support structure 112 may have a diameter less than an inner diameter of the stationary element 106 such that the rotatable element 104 may be disposed at least partially within a cavity 110 (e.g., interior region) of the stationary element 106. The rotatable element 104 may be configured with a shoulder 114 for additional axial support of the cutting table 101 when the cutting table 101 is engaging a portion of the subterranean borehole. In the embodiment shown in FIG. 2A, the stationary element 106 may include an inner sleeve 144 and an outer sleeve 150.

A biasing element 118 (e.g., spring, Belleville washer, etc.) may be interposed between the stationary element 106 and a base 116 of the rotatable element 104 (e.g., positioned within an internal portion of the cavity 110) proximate an assembly base 143. The biasing element 118 may be configured to act on the base 116, to bias the rotatable element 104 longitudinally along a longitudinal axis $L_{100}$ of the cutting element 100. One or more pins 122 may be positioned within the support structure 112 of the rotatable element 104 and a track 121 may be defined on the stationary element 106 (e.g., on the inner sleeve 144) as shown in FIG. 2A. The axial bias provided by the biasing element 118, supported by an end wall of a pocket on the earth-boring tool in which the cutting element 100 is placed and to which the stationary element 106 is secured, urges the pins 122 to engage a wall of the track 121 and cause rotation of the rotatable element 104 responsive to the cutting element 100 engaging and disengaging a subterranean formation during a drilling operation. The pin 122 may include a pin shoulder 130 and a pin tip 132 adjacent a biasing member 128 (e.g., a spring). In some embodiments, the cutting element 100 may also include one or more seals 142 positioned in seal seats located, for example, in side surfaces of the support structure 112. The seals 142 may be sized and configured to form a seal between the rotatable element 104 and the stationary element 106 to prevent drilling mud and formation debris from stalling rotation of the rotatable element 104 and/or to retain a substantially incompressible fluid.

Embodiments of rotatable cutting elements may improve the wear characteristics on such cutting elements. Rotating the cutting elements with an index positioning feature that enables positive, incremental rotation of the cutting element may allow for tighter control of the rotation of the rotatable cutting element that may ensure more even wear on the cutting surface as described in, for example, U.S. patent application Ser. No. 15/662,626, filed Jul. 28, 2017 and titled "Rotatable Cutters and Elements for Use on Earth-Boring Tools in Subterranean Boreholes and Related Methods," the disclosure of which is incorporated herein in its entirety by this reference.

The sleeves 144, 150 of the stationary element 106 may be formed from a hard metal material suitable for use in a borehole, such as, for example, a metal, an alloy (e.g., hardened tool steel), ceramic-metal composite material (e.g., cobalt-cemented tungsten carbide), or combinations thereof. The inner sleeve 144 and the outer sleeve 150 may be formed of the same, or different, materials. For example, the outer sleeve 150 may be formed from an abrasion- and erosion-resistant material such as cobalt-cemented tungsten carbide, while the inner sleeve 144 may be formed of a durable, high strength material such as hardened tool steel.

Each of the inner sleeve 144 and the outer sleeve 150 may be sized and shaped to facilitate retention of the rotatable cutting element 100. For example, the inner sleeve 144 and the outer sleeve 150 may, in combination as assembled, have an inner diameter of about 0.500 in. and an outer diameter of about 0.750 in. By way of non-limiting example, a minimum wall thickness of each of the sleeves 144, 150 may be about 0.025 in. For example, a minimum wall thickness of the inner sleeve 144 may be about 0.050 in. in a finished state and a minimum wall thickness of the outer sleeve 150 may be about 0.075 in. in a finished state. Further, the wall thickness of the inner sleeve 144 may be between about 30% and about 100% of the wall thickness of the outer sleeve 150. In some embodiments, the inner sleeve 144 and/or the outer sleeve 150 may initially be formed (e.g., prior to bonding) having a greater wall thickness than that of the finished state. The depth of the track 121 measured radially inwardly from an outer surface of the inner sleeve 144 may be between about 0.010 in. and about 0.100 in., for example. Further, the depth of the track 121 may be less than 20% of an inner diameter of the inner sleeve 144.

In some embodiments, the index positioning feature 120 including the track 121, for example, may be defined in the support structure 112 of the rotatable element 104. In other embodiments, the index positioning feature 120 including the track 121 may be defined in the stationary element 106 in order to minimize section thickness reduction on the rotatable cutting element 100. However, forming internal features (e.g., annular recesses) such as the track 121 and/or seal seats for the seals 142 extending entirely around a perimeter (e.g., circumference) of an inner surface of the stationary element 106 may pose difficulties in forming such features due to limited access to inner surfaces of the sleeves 144, 150 and in machining hard, wear-resistant materials, such as tungsten carbide. The present disclosure provides methods by which such internal recesses may be formed.

Figure 2B:
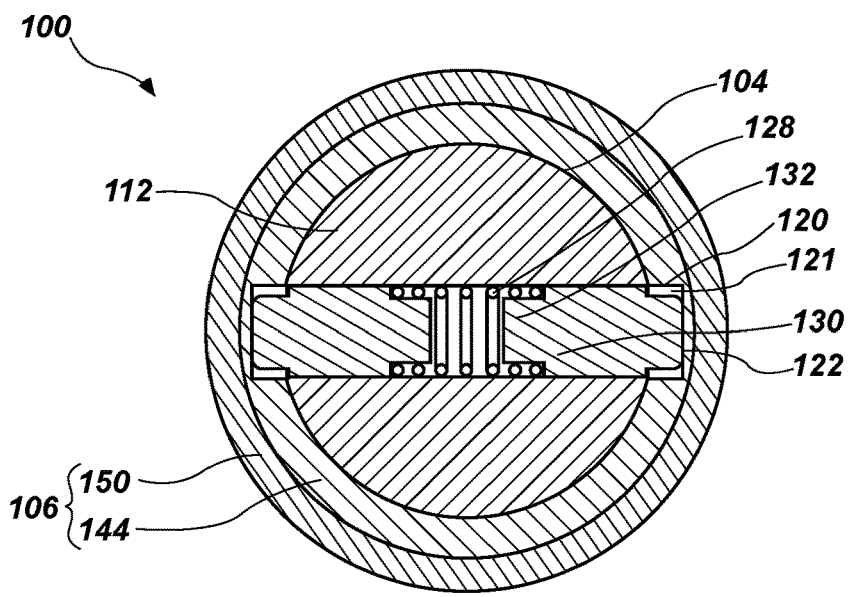
FIG. 2B is a cross-sectional top view of the rotatable cutting element and the stationary element of FIG. 2A.

FIG. 2B is a cross-sectional top view of the rotatable cutting element 100, the rotatable element 104 and the stationary element 106 of FIG. 2A. The cross-sectional view of FIG. 2B is taken along line B-B of FIG. 2A. In particular, the inner sleeve 144 is shown to be bonded within a cavity of the outer sleeve 150 of the stationary element 106. As discussed above, the rotatable cutting element 100 may include a support structure 112 of the rotatable element 104 at least partially disposed within the stationary element 106. The pins 122 may be positioned within the support structure 112 and the track 121 of the index positioning feature 120 may be defined on the stationary element 106 (e.g., on the inner sleeve 144) for receiving the pins 122 as shown in FIG. 2B. The pin 122 may include a pin shoulder 130 and a pin tip 132 adjacent a biasing member 128 (e.g., a spring).

In some embodiments, the stationary element 106 may include the inner sleeve 144 and the outer sleeve 150, as discussed below in greater detail with reference to FIGS. 3-5. In other embodiments, a stationary element may include a single sleeve having an upper portion and a lower portion, as discussed below in greater detail with reference to FIGS. 6A-8.

Figure 3:
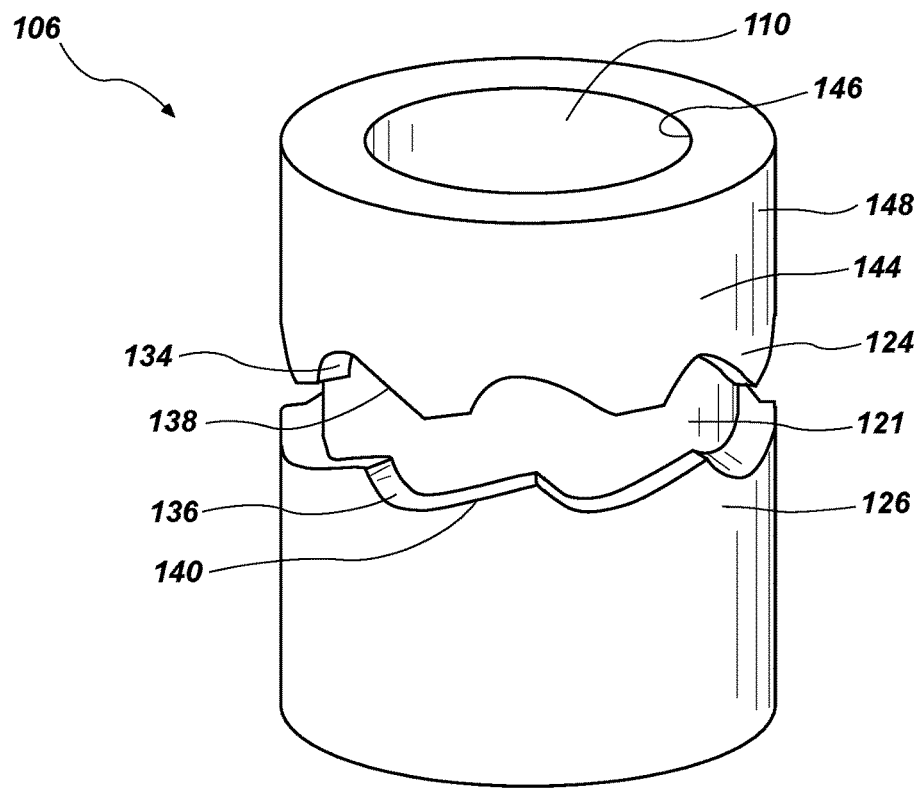
Figure 4:
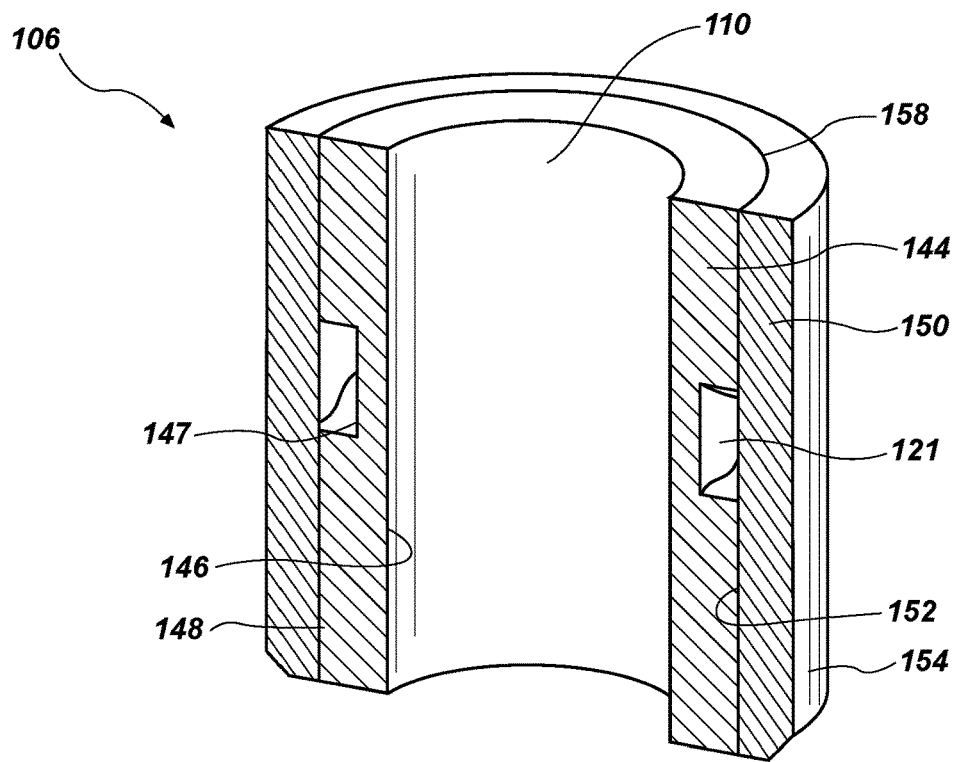
Figure 5:
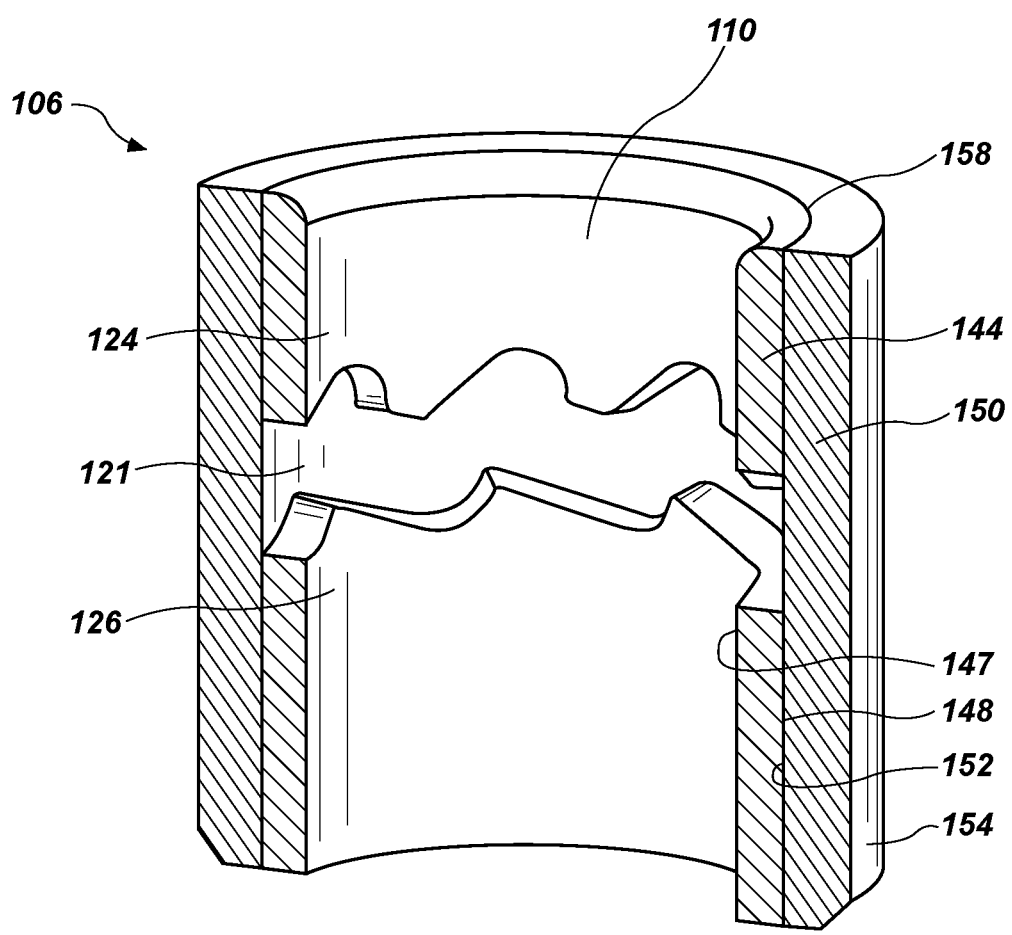

FIGS. 3 through 5 illustrate stages in a process for forming internal features (e.g., annular recesses) on an inner surface of a sleeve, such as the stationary element 106 of the rotatable cutting element 100 of FIG. 2A. One or more generally cylindrical sleeves (e.g., carbide sleeves that have been hot isostatically pressed and sintered) may be formed separately and provided for forming a single sleeve having an interface extending annularly about a central axis thereof. FIG. 3 is a perspective view of a portion of the stationary element 106 including a precursor structure of the inner sleeve 144 to be joined with the outer sleeve 150, as shown in FIG. 2A. The inner sleeve 144 precursor structure includes a generally cylindrical sleeve having a first inner surface 146 and an outer surface 148. In some embodiments, the inner sleeve 144 precursor structure may have an additional thickness proximate the first inner surface 146 in order to provide extra material stock for subsequent removal. Prior to joining the inner sleeve 144 to the outer sleeve 150, one or more annular recesses (e.g., the track 121) are formed around a perimeter (e.g., circumference) of the outer surface 148 of the inner sleeve 144. For example, the track 121 may be formed to extend around an entire perimeter (e.g., circumference) between opposing longitudinal ends of the inner sleeve 144 precursor structure. The track 121 may comprise an upper track portion 124 and a lower track portion 126. The upper track portion 124 may include one or more top track detents 134 and one or more top track ramps 138, while the lower track portion 126 may include one or more bottom track detents 136 and one or more bottom track ramps 140.

For example, the track 121 may be formed by removing material from the outer surface 148 of the inner sleeve 144 precursor structure to form a recess while remaining portions of material form the upper track portion 124 and the lower track portion 126. For example, material may be removed from the outer surface 148 to a predetermined depth (e.g., less than a total thickness of the inner sleeve 144 precursor structure). In some embodiments, the track 121 may be formed in the outer surface 148 of the inner sleeve 144 by machining. For example, the track 121 may be machined using an electrical discharge machining (EDM) process (e.g., an orbital EDM process) to machine the track 121 by removing material from the outer surface 148 of the inner sleeve 144 precursor structure. In other embodiments, conventional mechanical machining processes may be used to machine the track 121 by removing material from the outer surface 148 of the inner sleeve 144 precursor structure. Such mechanical machining processes may comprise one or more of grinding, milling, and drilling the outer surface 148. Further, machining processes may include conventional 3-axis machining or, alternatively, 5-axis machining. In some embodiments, material may be removed to form the track 121 while the inner sleeve 144 precursor structure is in the so-called "green state" (e.g., unsintered) or in the so-called "brown state" (e.g., at least partially sintered). After forming the track 121, the outer surface 148 of the inner sleeve 144 precursor structure may optionally be treated (e.g., polished) to provide an improved surface finish to the machined surfaces and/or to achieve predetermined tolerances.

FIG. 4 illustrates an assembly of the stationary element 106 including the inner sleeve 144 precursor structure disposed within a cavity of the outer sleeve 150. The outer sleeve 150 has an inner surface 152 and an outer surface 154. As shown in FIG. 4, the outer surface 148 of the inner sleeve 144 precursor structure may be positioned to abut (e.g., be in direct physical contact with) the inner surface 152 of the outer sleeve 150 along interface 158. The inner sleeve 144 precursor structure includes the first inner surface 146 defining the cavity 110 and a second inner surface 147 defining an inner boundary (e.g., depth) of the track 121. In such a configuration, the recess of the track 121 is located proximate to the inner surface 152 of the outer sleeve 150 without being exposed (e.g., open to) to the cavity 110.

Further, top and bottom surfaces of each of the inner sleeve 144 precursor structure and the outer sleeve 150 may be formed to be substantially coincident (e.g., substantially flush) with one another. Thus, the inner sleeve 144 precursor structure may be fully contained within a cavity of the outer sleeve 150. In other embodiments, at least one of the top and/or the bottom surfaces of the inner sleeve 144 precursor structure and the outer sleeve 150 may not be coincident and the inner sleeve 144 may be at least partially contained within the cavity of the outer sleeve 150.

The outer sleeve 150 may also be formed from a hard material suitable for use in a borehole, similar to materials used to form the inner sleeve 144 precursor structure. Further, the material of the outer sleeve 150 may be formed to be the same as or different from the material of the inner sleeve 144. Thus, the inner sleeve 144 may be a separately-formed structure that is then disposed (e.g., inserted) within the cavity of the outer sleeve 150. When the inner sleeve 144 is disposed within the outer sleeve 150, the inner sleeve 144 is not yet affixed to the outer sleeve 150. In some embodiments, the sleeves 144, 150 may be heated and/or cooled or otherwise treated to facilitate placement thereof. For example, the inner sleeve 144 precursor structure may be cooled and the outer sleeve 150 heated to provide clearance for insertion of the inner sleeve 144 precursor structure and the assembly cooled to form a shrink interference fit between the two components.

With continued reference to FIG. 4, after disposing the inner sleeve 144 within the outer sleeve 150, the inner sleeve 144 and the outer sleeve 150 may be joined (e.g., sinter bonded, welded, etc.) to affix (e.g., permanently bond) the separately-formed structures together at the interface 158 to form the stationary element 106. In some embodiments, a shrink fit may be employed, as noted above. In other embodiments, a binder material (e.g., a sintering material) may be used to facilitate attachment of the separately-formed structures. For example, the sintering material may be disposed between the inner sleeve 144 precursor structure and the outer sleeve 150 prior to placement. In still other embodiments, other materials (e.g., a braze material) may be used to facilitate attachment thereof. In some embodiments, the inner sleeve 144 and/or the outer sleeve 150 may be in the so-called "brown state" (e.g., at least partially sintered) prior to being joined. The inner sleeve 144 precursor structure may then be affixed (e.g., sinter bonded) to the outer sleeve 150 in a subsequent process, while optionally using the binder material. The subsequent process may be conducted at a pressure comparable to that used in the initial sintering process, or may conducted at a higher pressure or a lower pressure. Temperatures may also be the same or different from those employed in the initial sintering process during attachment of the sleeve 144 precursor structure and sleeve 150.

With reference to FIG. 5, after joining (e.g., sinter bonding) the inner sleeve 144 with the outer sleeve 150, portions of material located along the first inner surface 146 (FIG. 4) of the inner sleeve 144 may be removed radially outwardly from the cavity 110 to the predetermined depth of the diameter of the second inner surface 147 in order to expose the track 121, which is defined by the upper track portion 124 and the lower track portion 126. Thus, as shown in FIG. 5, a portion (e.g., substantially all) of the material of the inner sleeve 144 precursor structure between the first inner surface 146 and the second inner surface 147 has been removed exposing the track 121 to the cavity 110 and forming the inner sleeve 144. The cavity 110 of the inner sleeve 144 is now defined by the second inner surface 147, and the depth of the track 121 may now be measured from the second inner surface 147 to the interface 158 located at the intersection of the outer surface 148 of the inner sleeve 144 and the inner surface 152 of the outer sleeve 150.

In some embodiments, the material may be removed by conventional mechanical machining processes, including one or more of grinding, milling, and drilling, or a combination thereof. In other embodiments, the material may be removed using an EDM process. In addition, portions of outer ends of one or more of the sleeves 144, 150 may be removed (e.g., rounded, chamfered, etc.) to facilitate insertion of the rotatable cutting element 100 of FIG. 2A. Finally, the stationary element 106 (i.e., the combined sleeves 144, 150) may optionally be treated (e.g., polished) to provide an improved surface finish to the surfaces thereof and/or to achieve predetermined tolerances.

In some embodiments, the material may be removed from the first inner surface 146 of the inner sleeve 144 substantially concentrically and/or symmetrically. In other embodiments, the material may be removed unevenly (e.g., eccentrically, asymmetrically, etc.) to facilitate placement of specialized cutting elements within a sleeve, for example, for placement of rotatable devices including "orbiting cutting elements" that orbit (e.g., revolve) about a central axis of a sleeve as described in U.S. patent application Ser. No. 15/704,955, filed Sep. 14, 2017 and titled "Earth-Boring Tools Including Rotatable Cutting Element Assemblies and Related Methods of Forming and Using the Same," the disclosure of which is incorporated herein in its entirety by this reference.

Figure 6A:
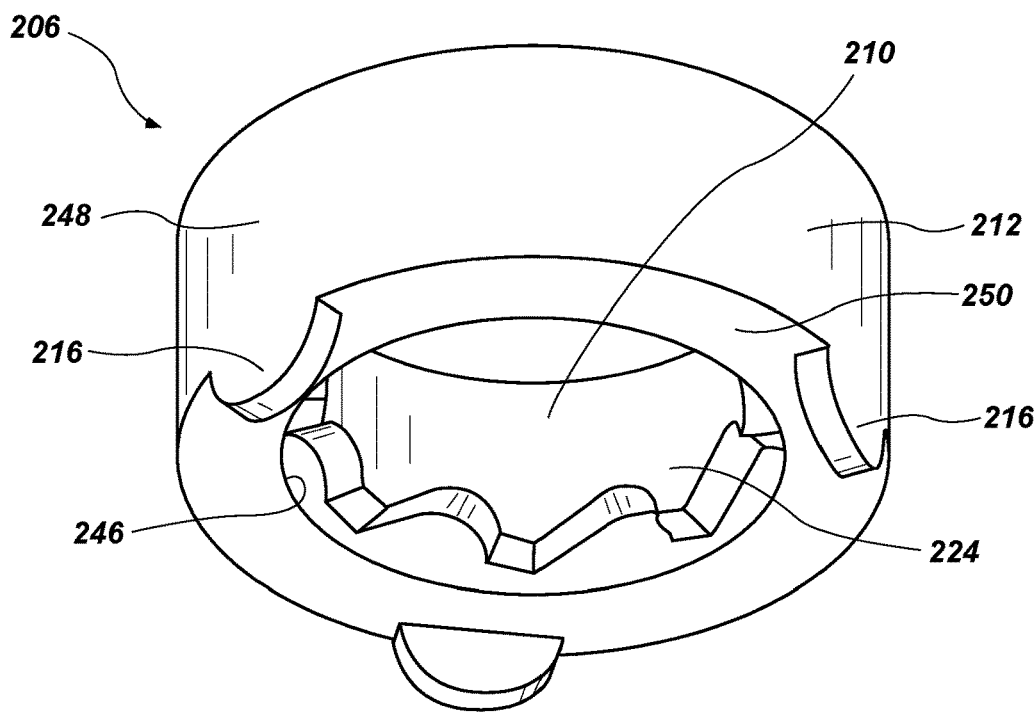

FIGS. 6A through 8 illustrate stages in a process for forming internal features (e.g., annular recesses) on an inner surface of a sleeve, such as the stationary element 106 of the rotatable cutting element 100 of FIG. 2A, according to another embodiment of the present disclosure. One or more generally cylindrical sleeves (e.g., carbide sleeves that have been hot isostatically pressed and sintered) may be formed separately and assembled to form a single sleeve, for example, segmented laterally about the sleeve centerline and through the a recess of a track. FIG. 6A is a bottom perspective view of an upper portion 212 of a stationary element 206 (e.g., stationary housing) and FIG. 6B is a top perspective view of a lower portion 214 of the stationary element 206 shown in FIG. 6A.

As shown in FIG. 6A, the upper portion 212 includes a generally cylindrical sleeve having an inner surface 246, an outer surface 248, and a bottom surface 250. The inner surface 246 defines a cavity 210 (e.g., interior region). In some embodiments, one or more protrusions 216 (e.g., tabs) may be formed in the upper portion 212 along an outer periphery thereof to facilitate alignment of the upper portion 212 with the lower portion 214, as discussed in greater detail below. Prior to joining the upper portion 212 to the lower portion 214, portions of a track 221 (FIG. 8) are formed around a perimeter (e.g., circumference) of the inner surface 246 of the upper portion 212 to define an upper track portion 224. For example, the track 221 may extend around an entire perimeter of the inner surface 246 proximate a longitudinal end of the upper portion 212. The upper track portion 224 may include one or more features (e.g., detents and ramps) as discussed in greater detail above with reference to FIG. 3.

Figure 6B:
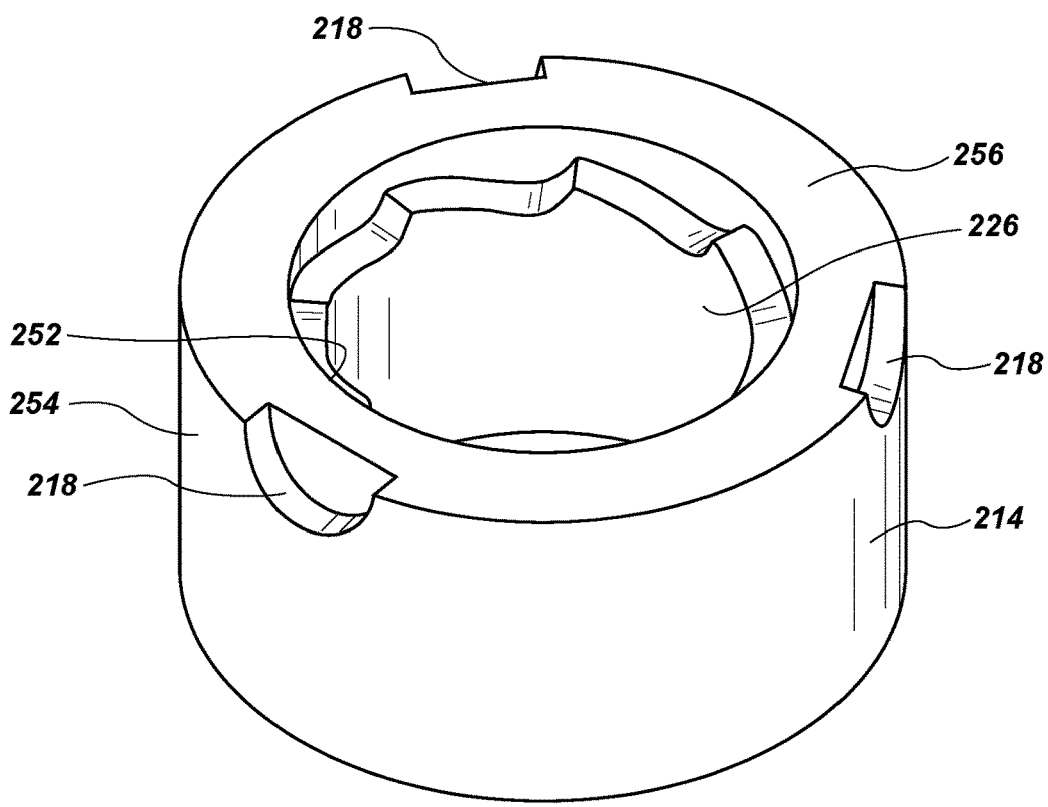
FIG. 6B is a top perspective view of a lower portion of the stationary element shown in FIG. 6A.
Figure 8:
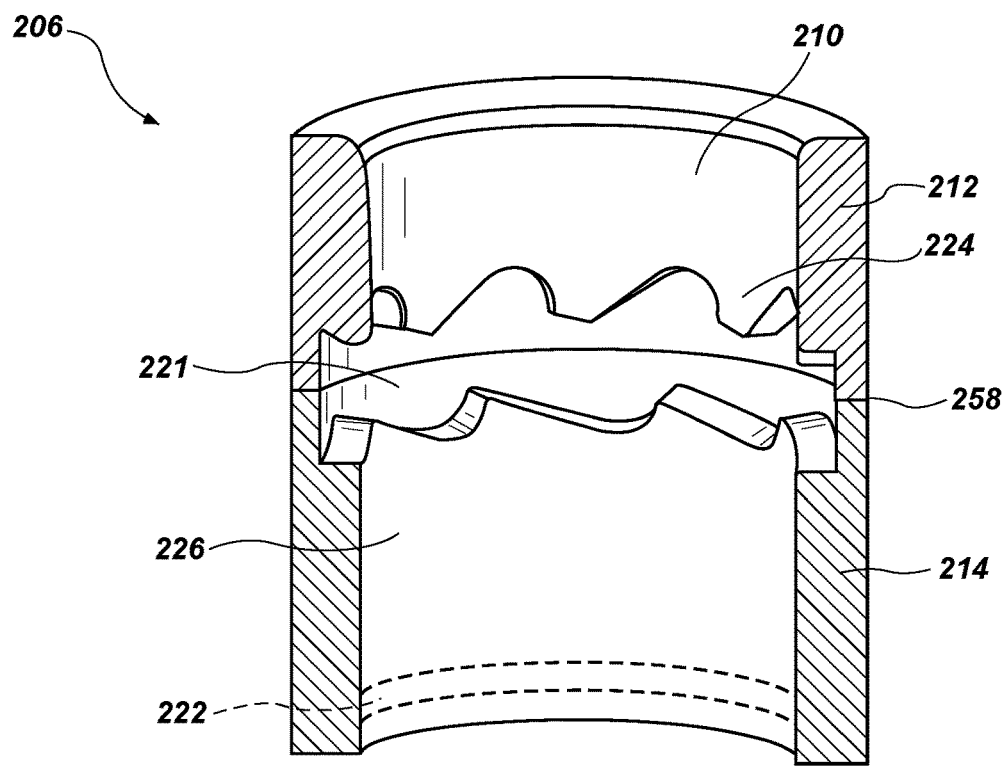

As shown in FIG. 6B, the lower portion 214 includes a generally cylindrical sleeve having an inner surface 252, an outer surface 254, and an upper surface 256. Further, inner and outer diameters of the lower portion 214 may be substantially coincident with the inner and outer diameters of the upper portion 212 of FIG. 6A. In some embodiments, one or more recesses 218 may be formed in the lower portion 214 along an outer periphery thereof at like circumferential intervals to protrusions 216. In addition, the protrusions 216 of the upper portion 212 and the recesses 218 of the lower portion 214 may be formed to be complementary in size and shape to engage one another. In other embodiments, the upper portion 212 may include the recesses 218 and the lower portion 214 may include the protrusions 216. In yet other embodiments, alternative indexing features may be used to facilitate alignment of the upper portion 212 with the lower portion 214 to enable proper alignment of opposing features of the track 221 (FIG. 8). While the embodiments of FIGS. 6A and 6B illustrate two or more (e.g., three) indexing features, it may be appreciated that other amounts, for example, a single protrusion 216 and a single recess 218 may be utilized for proper alignment of the portions 212, 214. Prior to joining the upper portion 212 to the lower portion 214, portions of the track 221 (FIG. 8) are formed around a circumference of the inner surface 252 of the lower portion 214 to define lower track portion 226. In some embodiments, the tracks 221 may formed by removing material in mutually opposing regions near longitudinal ends of each of the upper portion 212 and the lower portion 214. Further, the tracks 221 may extend around an entire perimeter of the inner surface 252 proximate a longitudinal end of the lower portion 214. The lower track portion 226 may also include one or more features (e.g., detents and ramps).

Each of the upper portion 212 and the lower portion 214 of FIGS. 6A and 6B may be formed separately prior to joining the upper portion 212 and the lower portion 214 to form the stationary element 206. For example, each of the portions 212, 214 may be formed by removing material from the inner surfaces 246, 252 thereof while remaining portions of material form the upper track portion 224 and the lower track portion 226. Because the upper track portion 224 is formed proximate the bottom surface 250 of the upper portion 212 and the lower track portion 226 is formed proximate the upper surface 256 of the lower portion 214, material may be removed from the inner surfaces 246, 252 by conventional methods (e.g., machining) due to the proximity of the material to be removed to the surfaces 250, 256 of the respective portions 212, 214. For example, portions of the inner surfaces 246, 252 may be machined using an electrical discharge machining (EDM) process (e.g., an orbital EDM process) to form the track portions 224, 226 by removing material from the inner surfaces 246, 252 of each of the portions 212, 214. In other embodiments, conventional mechanical machining processes may be used to machine portions of the inner surfaces 246, 252 to remove material therefrom. Such mechanical machining processes may comprise one or more of grinding, milling, and drilling, for example. In some embodiments, material may be removed to form the track portions 224, 226 while the portions 212, 214 are in the so-called "brown state" (e.g., at least partially sintered).

In other embodiments, each of the portions 212, 214 may be formed by traditional methods and/or Additive Manufacturing (AM), including without limitation, casting, molding, 3D printing, laser sintering, or a combination thereof. As with the previous embodiment, the portions 212, 214 may also be formed separately. Further, having each of the portions 212, 214 formed separately may facilitate the ability to release the portions 212, 214 from a die. After forming the upper portion 212 and the lower portion 214, each of the portions 212, 214 may optionally be treated (e.g., polished) to provide an improved surface finish to the surfaces and/or to achieve predetermined tolerances. Such treatment may be performed prior to and/or after joining the portions 212, 214. Further, the upper portion 212 and the lower portion 214 may be formed prior to or after one another or, alternatively, at substantially the same time. In embodiments in which the upper portion 212 and the lower portion 214 are formed separately, dimensions (e.g., inner diameters, outer diameters, etc.) may be formed to coincide with one another.

Each of the upper portion 212 and the lower portion 214 may be sized and shaped to facilitate retention of the rotatable cutting element 100 of FIG. 2A. By way of non-limiting example, a minimum wall thickness of each of the portions 212, 214 may be about 0.025 in. For example, each of the portions 212, 214 may have an inner diameter of about 0.500 in. and an outer diameter of about 0.750 in. The depth of the track 221 measured radially outward from an inner surface of each of the portions 212, 214 may be between about 0.010 in. and about 0.100 in., for example. Further, the depth of the track 121 may be less than 20% of an inner diameter of each of the portions 212, 214. In some embodiments, each of the portions 212, 214 may have an additional thickness proximate the outer surfaces 248, 254 in order to provide extra material stock for subsequent removal.

The upper portion 212 and the lower portion 214 of the stationary element 206 may be formed from a hard material suitable for use in a borehole, similar to materials used to form the inner sleeve 144 (FIG. 2A). Further, the material of the upper portion 212 may be the same as or different from the material of the lower portion 214.

Figure 7:
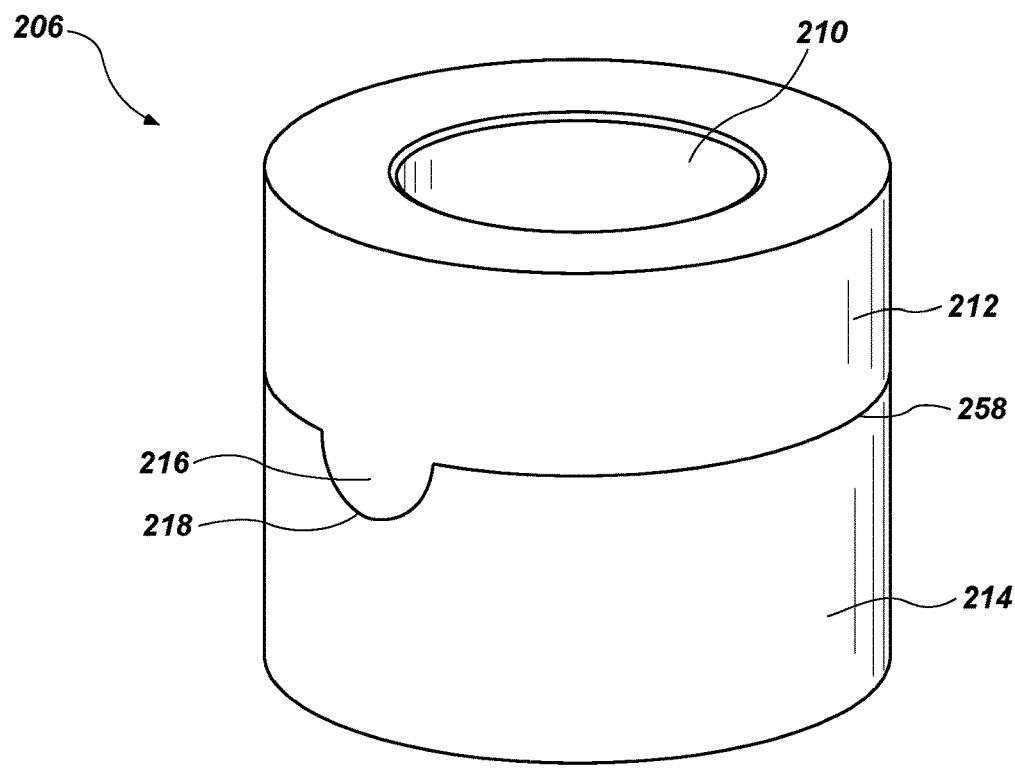

FIG. 7 illustrates an assembly of the stationary element 206 including the upper portion 212 and the lower portion 214. After separately forming and preparing the portions 212, 214, the bottom surface 250 (FIG. 6A) of the upper portion 212 may be positioned to abut (e.g., be in direct physical contact with) the upper surface 256 (FIG. 6A) of the lower portion 214 forming an interface 258 therebetween. For example, the interface 258 may extend transverse to a longitudinal axis of each of the portions 212, 214. In addition, the protrusions 216 of the upper portion 212 may be positioned within the recesses 218 of the lower portion 214 to facilitate proper alignment between the portions 212, 214 in order to ensure proper alignment of features (e.g., detents and ramps) of each of the track portions 224, 226 (FIG. 8).

After positioning the surfaces 250, 256 of the respective portions 212, 214 adjacent one another, the portions 212, 214 may be joined (e.g., sinter bonded, welded, etc.) to affix (e.g., permanently bond) the separately-formed structures together at the interface 258 to form the stationary element 206. In some embodiments, a binder material (e.g., a sintering material) may be used to facilitate attachment of the separately-formed structures. For example, the sintering material may be disposed between the upper portion 212 and the lower portion 214 prior to placement. In other embodiments, other materials (e.g., a braze material) may be used to facilitate attachment thereof. Each of the portions 212, 214 may be in the so-called "green state" (e.g., unsintered) or in the so-called "brown state" (e.g., at least partially sintered) prior to being joined. The portions 212, 214 may then be affixed (e.g., sinter bonded) in an initial or subsequent sintering process, while optionally using the binder material. The subsequent sintering process may be conducted at a pressure comparable to that used in the initial sintering process, or may conducted at a higher pressure or a lower pressure. Temperatures may also be the same or different from those employed in the initial sintering process during attachment of the portions 212, 214.

With continued reference to FIG. 7, after joining (e.g., sintering) the portions 212, 214, portions of additional material located along the outer surfaces 248, 254 thereof may be removed to a predetermined diameter. In some embodiments, the material may be removed by conventional mechanical machining processes, including one or more of grinding, milling, and drilling, or a combination thereof. In other embodiments, the material may be removed using an EDM process. In addition, portions of outer ends of one or more of the sleeves 144, 150 may be removed (e.g., rounded, chamfered, etc.) to facilitate attachment to the rotatable cutting element 100 of FIG. 2A. Finally, the stationary element 206 (i.e., the combined portions 212, 214) may optionally be treated (e.g., polished) to provide an improved surface finish to the surfaces thereof and/or to achieve predetermined tolerances.

FIG. 8 shows a cross-sectional view from within the cavity 210 of the stationary element 206 shown in FIG. 7. After joining (e.g., sintering) the upper portion 212 to the lower portion 214, the track 221 may be defined between the upper track portion 224 and the lower track portion 226. As shown in FIG. 8, the interface 258 between the portions 212, 214 may be located (e.g., substantially centered) within the track 221. In addition, the features (e.g., detents and ramps) of the track portions 224, 226 are properly aligned with one another.

As depicted in FIG. 8, the stationary element 206 may optionally include one or more (e.g., two) seal seats 222, as shown by dashed lines, disposed therein. In some embodiments, the seals 142 (FIG. 2A) may be associated primarily with the stationary element 206 in the respective seal seats 222 rather than in respective seal seats disposed within the support structure 112 of the rotatable element 104, as shown in FIG. 2A. For example, seal seats 222 may be positioned on or at least partially within the inner surface 246 of the upper portion 212 and/or the inner surface 252 of the lower portion 214 of the stationary element 206. Such seals and/or seal seats disclosed herein may be similar to those described in, for example, U.S. patent application Ser. No. 15/662,647, filed Jul. 28, 2017 and titled "MOVEABLE CUTTERS AND DEVICES INCLUDING ONE OR MORE SEALS FOR USE ON EARTH-BORING TOOLS IN SUBTERRANEAN BOREHOLES AND RELATED METHODS," the disclosure of which is incorporated herein in its entirety by this reference. The seal seats 222 may be formed by removing material from the inner surfaces 246, 252 of the portions 212, 214. For example, portions of the inner surfaces 246, 252 may be machined using electrical discharge machining (EDM) processes and/or conventional mechanical machining processes, including grinding, milling, and drilling, at any time before, during, or after formation of the track 221. Alternatively, the seal seats 222 may be formed during casting, molding, 3D printing, or laser sintering, for example, of the portions 212, 214.

Thus, according to the present embodiment, the portions 212, 214 may be assembled to form a single stationary element 206 (e.g., sleeve). The upper portion 212 having been joined to the lower portion 214 along substantially all of a surface area of each of the surfaces 250, 256 thereof may provide the interface 258 therebetween extending laterally about the centerline of the stationary element 206 and through the track 221. After the portions 212, 214 have been joined and bonded, the rotatable element 104 of the rotatable cutting element 100 (FIG. 2A) may be inserted within the cavity 210 of the stationary element 206. Alternatively, the rotatable element 104 may be inserted prior to adjoining and bonding the portions 212, 214. For example, the pins 122 may be positioned within the support structure 112 of the rotatable element 104 (FIG. 2A) and may positioned within the track 221 prior to positioning the portions 212, 214 proximate to one another and prior to bonding. Following installation of the rotatable cutting element 100 within the stationary element 206, the rotatable cutting element 100 may be affixed to a body of the earth-boring tool 10 (FIG. 1).

Accordingly, also disclosed is a stationary element, such as the stationary elements 106, 206, of the rotatable cutting element 100 and formed by the methods disclosed in the embodiment of FIGS. 3-5 or the embodiment of FIGS. 6A-8, respectively. As such, the single stationary element 106 may include a first generally cylindrical sleeve and a second generally cylindrical sleeve sinter bonded to the first generally cylindrical sleeve along the interface 158 therebetween. In some embodiments, the interface 158 of the stationary element 106 may extend annularly about a central axis of the inner sleeve. In other embodiments, the interface 258 of the stationary element 206 may extend laterally about a centerline between the upper portion 212 and the lower portion 214 and through a recess of the track 221.

Embodiments of the disclosure may be particularly useful in providing methods of forming features, such as a complex track geometry, within internal surfaces of a stationary element, such as a sleeve and/or a housing, for retaining a rotatable cutting element. Thus, the track may be formed on the stationary element to avoid removing material from the rotatable cutting element to form such a track and, thus, maintaining strength of a thicker rotatable cutting element. In addition, such methods may be useful in allowing pins engaging the track to be installed along with the rotatable cutting element, avoiding excessive heat during formation and installation thereof, and enabling the pins to be located internal to rather than extending though the sleeve and being exposed to the harsh environment of the wellbore. Further, installation of the pins during installation of seals and lubricant may simplify such processes.

Additional non-limiting example embodiments of the disclosure are described below.

Embodiment 1: A method of forming a stationary housing of a rotatable cutting element for use on an earth-boring tool, the method comprising: forming at least one annular recess extending around an outer surface of a first generally cylindrical sleeve; inserting the first generally cylindrical sleeve within a second generally cylindrical sleeve; joining the first generally cylindrical sleeve with the second generally cylindrical sleeve; and removing a portion of material from an inner surface of the first generally cylindrical sleeve to expose the at least one annular recess.

Embodiment 2: The method of Embodiment 1, further comprising selecting at least one of the first generally cylindrical sleeve and the second generally cylindrical sleeve to comprise a wear-resistant material.

Embodiment 3: The method of Embodiment 1 or Embodiment 2, wherein forming the at least one annular recess comprises machining a track around an outer circumference of the first generally cylindrical sleeve to a predetermined depth, the predetermined depth being less than a total thickness of the first generally cylindrical sleeve.

Embodiment 4: The method of Embodiment 3, wherein machining the track around the outer circumference of the first generally cylindrical sleeve comprises using an electrical discharge machining process, a conventional mechanical machining process, or a combination thereof.

Embodiment 5: The method of any of Embodiments 1 through 4, wherein joining the first generally cylindrical sleeve with the second generally cylindrical sleeve comprises permanently bonding the first generally cylindrical sleeve to the second generally cylindrical sleeve along an interface therebetween.

Embodiment 6: The method of Embodiment 5, wherein permanently bonding the first generally cylindrical sleeve to the second generally cylindrical sleeve comprises sinter bonding the first generally cylindrical sleeve to the second generally cylindrical sleeve, each of the first generally cylindrical sleeve and the second generally cylindrical sleeve comprising a tungsten carbide material.

Embodiment 7: The method of any of Embodiments 1 through 6, wherein removing the portion of material from the inner surface of the first generally cylindrical sleeve comprises using at least one of grinding, milling, or drilling.

Embodiment 8: The method of Embodiment 1, further comprising polishing the inner surface of the first generally cylindrical sleeve after removing the portion of material from the inner surface of the first generally cylindrical sleeve.

Embodiment 9: A method of forming a stationary housing of a rotatable cutting element for use on an earth-boring tool, the method comprising: forming a first portion and a second portion of a generally cylindrical sleeve; forming an annular recess around an entire perimeter of an inner surface of each of the first portion and the second portion of the generally cylindrical sleeve proximate a longitudinal end thereof; positioning the longitudinal ends of the first portion and the second portion of the generally cylindrical sleeve; and bonding the longitudinal ends of the first portion and the second portion of the generally cylindrical sleeve to form a track comprising the annular recesses on an inner surface of the generally cylindrical sleeve.

Embodiment 10: The method of Embodiment 9, further comprising forming at least one complementary alignment feature on the longitudinal ends of each of the first portion and the second portion of the generally cylindrical sleeve, wherein positioning the longitudinal ends of the first portion and the second portion of the generally cylindrical sleeve comprises engaging the complementary alignment features.

Embodiment 11: The method of Embodiment 9 or Embodiment 10, further comprising removing a portion of material from an outer surface of each of the first portion and the second portion of the generally cylindrical sleeve after bonding the longitudinal ends of the first portion and the second portion.

Embodiment 12: The method of any of Embodiments 9 through 11, wherein bonding the longitudinal ends of the first portion and the second portion of the generally cylindrical sleeve comprises sinter bonding the longitudinal ends of the first portion and the second portion.

Embodiment 13: The method of any of Embodiments 9 through 12, wherein forming the first portion and the second portion of the generally cylindrical sleeve comprises: forming each of the first portion and the second portion to comprise a tungsten carbide material; and presintering each of the first portion and the second portion and removing material in mutually opposing regions near the longitudinal ends of each of the first portion and the second portion of the generally cylindrical sleeve.

Embodiment 14: The method of any of Embodiments 9 through 13, wherein forming the annular recess in the longitudinal ends of each of the first portion and the second portion of the generally cylindrical sleeve comprises machining portions of each of the first portion and the second portion to form the annular recess.

Embodiment 15: The method of Embodiment 9, wherein forming the first portion and the second portion of the generally cylindrical sleeve and forming the annular recess comprises forming each of the first portion and the second portion of the generally cylindrical sleeve including the annular recess using at least one of casting, molding, 3D printing, laser sintering, or a combination thereof.

Embodiment 16: The method of any of Embodiments 9 through 15, wherein forming the annular recess comprises forming at least one annular seal seat around the inner surface of at least one of the first portion or the second portion of the generally cylindrical sleeve.

Embodiment 17: A stationary housing of a rotatable cutting element for use on an earth-boring tool, comprising: a first generally cylindrical sleeve; and a second generally cylindrical sleeve secured to the first generally cylindrical sleeve along an interface therebetween, wherein at least one of the first generally cylindrical sleeve and the second generally cylindrical sleeve comprises surfaces defining at least one annular recess around an inner surface of the at least one of the first generally cylindrical sleeve and the second generally cylindrical sleeve for receiving at least one pin extending from a rotatable element disposed at least partially within an interior region of the stationary housing.

Embodiment 18: The stationary housing of Embodiment 17, wherein: the first generally cylindrical sleeve comprises an inner sleeve and the second generally cylindrical sleeve comprises an outer sleeve; the interface between the first generally cylindrical sleeve and the second generally cylindrical sleeve extends annularly about a central axis of the inner sleeve; and the at least one annular recess comprises at least one track extending annularly around an entire perimeter of the inner surface of the inner sleeve.

Embodiment 19: The stationary housing of Embodiment 17, wherein: the first generally cylindrical sleeve comprises a first portion and the second generally cylindrical sleeve comprises a second portion; the interface between the first generally cylindrical sleeve and the second generally cylindrical sleeve extends transverse to a longitudinal axis of each of the first portion and the second portion and through the at least one annular recess; and the at least one annular recess is defined by a first track portion located on an inner surface of the first portion and a second track portion located on an inner surface of the second portion.

Embodiment 20: The stationary housing of any of Embodiments 17 through 19, wherein the at least one annular recess further comprises at least one annular seal seat extending around the inner surface of at least one of the first generally cylindrical sleeve and the second generally cylindrical sleeve.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors. Further, embodiments of the disclosure have utility with different and various types and configurations of earth-boring tools.

What is claimed is:

1. A method of forming a stationary housing of a rotatable cutting element for use on an earth-boring tool, the method comprising:
    forming at least one annular recess extending around an entire perimeter of an outer surface of a first generally cylindrical sleeve;
    inserting the first generally cylindrical sleeve within a second generally cylindrical sleeve;
    bonding the first generally cylindrical sleeve to the second generally cylindrical sleeve; and
    removing a portion of material from an inner surface of the first generally cylindrical sleeve coincident with the at least one annular recess to form a track for receiving at least one pin extending from the rotatable cutting element disposed at least partially within a bore of the first generally cylindrical sleeve.

2. The method of claim 1, further comprising selecting at least one of the first generally cylindrical sleeve and the second generally cylindrical sleeve to comprise a wear-resistant material.

3. The method of claim 1, wherein forming the at least one annular recess comprises machining the track around an outer circumference of the first generally cylindrical sleeve to a predetermined depth, the predetermined depth being less than a total thickness of the first generally cylindrical sleeve.

4. The method of claim 3, wherein machining the track around the outer circumference of the first generally cylindrical sleeve comprises using an electrical discharge machining process, a conventional mechanical machining process, or a combination thereof.

5. The method of claim 1, wherein bonding the first generally cylindrical sleeve to the second generally cylindrical sleeve comprises permanently bonding the first generally cylindrical sleeve to the second generally cylindrical sleeve along an interface therebetween.

6. The method of claim 5, wherein permanently bonding the first generally cylindrical sleeve to the second generally cylindrical sleeve comprises sinter bonding the first generally cylindrical sleeve to the second generally cylindrical sleeve, each of the first generally cylindrical sleeve and the second generally cylindrical sleeve comprising a tungsten carbide material.

7. The method of claim 1, wherein removing the portion of material from the inner surface of the first generally cylindrical sleeve comprises using at least one of grinding, milling, or drilling.

8. The method of claim 1, further comprising polishing the inner surface of the first generally cylindrical sleeve after removing the portion of material from the inner surface of the first generally cylindrical sleeve.

9. A method of forming a stationary housing of a rotatable cutting element for use on an earth-boring tool, the method comprising:
    forming a first portion and a second portion of a generally cylindrical sleeve;
    forming an annular recess around an entire perimeter of an inner surface of each of the first portion and the second portion of the generally cylindrical sleeve proximate a longitudinal end thereof; and
    bonding the longitudinal ends of the first portion and the second portion of the generally cylindrical sleeve along an interface therebetween to define an inner cavity of the stationary housing and to form a track comprising the combined annular recesses on an inner surface of the generally cylindrical sleeve for receiving at least one pin extending from the rotatable cutting element disposed at least partially within the inner cavity of the stationary housing.

10. The method of claim 9, further comprising forming at least one complementary alignment feature on the longitudinal ends of each of the first portion and the second portion of the generally cylindrical sleeve, wherein positioning the longitudinal ends of the first portion and the second portion of the generally cylindrical sleeve comprises engaging the complementary alignment features.

11. The method of claim 9, further comprising removing a portion of material from an outer surface of each of the first portion and the second portion of the generally cylindrical sleeve after bonding the longitudinal ends of the first portion and the second portion.

12. The method of claim 9, wherein bonding the longitudinal ends of the first portion and the second portion of the generally cylindrical sleeve comprises sinter bonding the longitudinal ends of the first portion and the second portion.

13. The method of claim 9, wherein forming the first portion and the second portion of the generally cylindrical sleeve comprises:
   forming each of the first portion and the second portion to comprise a tungsten carbide material; and
   presintering each of the first portion and the second portion and removing material in mutually opposing regions near the longitudinal ends of each of the first portion and the second portion of the generally cylindrical sleeve.

14. The method of claim 9, wherein forming the annular recess in the longitudinal ends of each of the first portion and the second portion of the generally cylindrical sleeve comprises machining portions of each of the first portion and the second portion to form the annular recess.

15. The method of claim 9, wherein forming the first portion and the second portion of the generally cylindrical sleeve and forming the annular recess comprises forming each of the first portion and the second portion of the generally cylindrical sleeve including the annular recess using at least one of casting, molding, 3D printing, laser sintering, or a combination thereof.

16. The method of claim 9, wherein forming the annular recess comprises forming at least one annular seal seat around the inner surface of at least one of the first portion or the second portion of the generally cylindrical sleeve.

17. A stationary housing of a rotatable cutting element for use on an earth-boring tool, comprising:
   a first generally cylindrical sleeve; and
   at least one second generally cylindrical sleeve bonded to the first generally cylindrical sleeve along an interface therebetween, wherein at least one of the first generally cylindrical sleeve and the at least one second generally cylindrical sleeve comprises at least one surface defining an inner cavity of the stationary housing and at least one annular recess extending around an entire perimeter of an inner surface of the at least one of the first generally cylindrical sleeve and the at least one second generally cylindrical sleeve for receiving at least one pin extending from the rotatable cutting element disposed at least partially within the inner cavity of the stationary housing.

18. The stationary housing of claim 17, wherein:
   the first generally cylindrical sleeve comprises an outer sleeve and the at least one second generally cylindrical sleeve comprises at least one inner sleeve;
   the interface between the first generally cylindrical sleeve and the at least one second generally cylindrical sleeve extends annularly about a central axis of the at least one inner sleeve; and
   the at least one annular recess comprises at least one track extending annularly around the entire perimeter of the inner surface of the at least one inner sleeve.

19. The stationary housing of claim 17, wherein:
   the first generally cylindrical sleeve comprises a first portion and the at least one second generally cylindrical sleeve comprises a second portion;
   the interface between the first generally cylindrical sleeve and the at least one second generally cylindrical sleeve extends transverse to a longitudinal axis of each of the first portion and the second portion and through the at least one annular recess; and
   the at least one annular recess is defined by a first track portion located on an inner surface of the first portion and a second track portion located on an inner surface of the second portion.

20. The stationary housing of claim 17, wherein the at least one annular recess further comprises at least one annular seal seat extending around the inner surface of at least one of the first generally cylindrical sleeve and the at least one second generally cylindrical sleeve.

* * * * *

UNITED STATES PATENT AND TRADEMARK OFFICE
CERTIFICATE OF CORRECTION

PATENT NO. : 10,619,421 B2  
APPLICATION NO. : 15/810412  
DATED : April 14, 2020  
INVENTOR(S) : Jon David Schroder, Kegan L. Lovelace and John Abhishek Raj Bomidi Page 1 of 1

It is certified that error appears in the above-identified patent and that said Letters Patent is hereby corrected as shown below:

In the Specification  
Column 15, Line 14, change "16:The" to --16: The--  
Column 15, Line 32, change "18:The" to --18: The--

Signed and Sealed this  
Twelfth Day of May, 2020

Andrei Iancu  
*Director of the United States Patent and Trademark Office*